Patented Apr. 17, 1928.

1,666,241

UNITED STATES PATENT OFFICE.

ROBERT LANTZ, OF PARIS, AND ANDRÉ WAHL, OF ENGHIEN, FRANCE, ASSIGNORS OF ONE-HALF TO SOCIETE ANONYME DES MATIERES COLORANTES & PRODUITS CHIMIQUES DE SAINT-DENIS, OF PARIS, FRANCE.

MANUFACTURE OF NEW DERIVATIVES OF NAPHTHOQUINONES.

No Drawing. Application filed January 21, 1926, Serial No. 82,878, and in France January 21, 1925.

In U. S. Patent application Serial No. 670,099, filed October 22, 1923, there is described the manufacture of a new series of naphtho-quinone derivatives of the general formula:

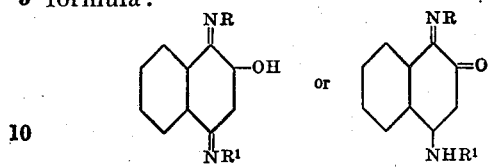

These may be called 2-hydroxy-1:4-diarylininonaphthoquinones or 4-arylamino-1-arylimino-2-naphthoquinones, accordingly as the first or the second of the above formulæ represents the constitution. In these formulæ R and R¹ may represent identical or different aromatic radicals. In the aforesaid specification it has been pointed out that the arylimino-group in the 1-position may be exchanged by action of a different primary amine under suitable conditions. This exchange, which constitutes a general reaction, may be expressed by the equation:

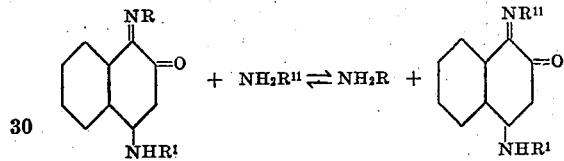

It was hoped that the same reaction might be realized in the case of the most simple members of the series, in which R becomes hydrogen, but these compounds which would be represented by the formulæ:

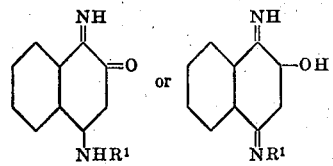

and would be called 1-imino-4-arylimino-2-naphthoquinone or 1-imino-2-oxy-4-aryl-iminonaphthoquinone, are not known.

Their analogues, the 2-hydroxy-4-aryl-imino-1-naphthoquinones, which differ from them only by substitution of O for NH, are obtained by the reaction between β naphthoquinone or its sulphonated derivative and an aromatic amine, but the same process cannot be used for making the imino-derivatives for neither imino-naphthoquinone nor iminonaphthoquinone sulphonic acid is known.

According to the present invention it is possible under suitable conditions to realize simultaneously the oxidation and the condensation of the aminonaphthol 1.2, substituted or not in position 4 by a sulphonic group, with the primary aromatic amines. The reaction may now be written as follows:

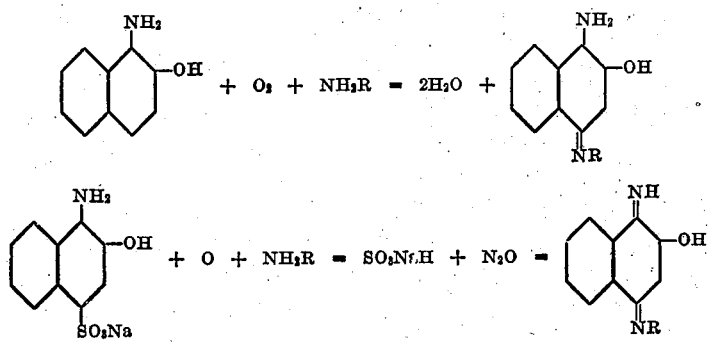

The most suitable oxidizing agent is atmospheric oxygen, or better pure oxygen, under pressure or not, but other oxidizing agents may be used.

It should be observed that aminonaphthol and its 4-sulphonic acid may be prepared from nitrosonaphthol, which is subjected to reducing agents. However, it is not necessary to first reduce the nitroso-naphthol to aminonaphthol 1.2 or to aminonaphtholsulphonic 1-2-4 so as to subsequently re-oxidize these bodies in the presence of the primary aromatic amines; applicants have in fact found that the nitrosonaphthol 1.2 may be made to react directly upon the primary aromatic amines according to the formula:

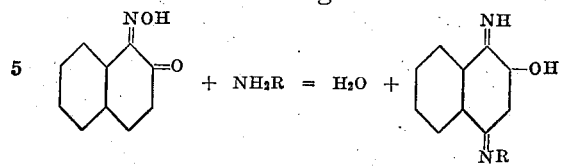

The imino-2-hydroxy-2-arylimino-4-naphthoquinones thus made are yellow, more or less orange bodies, soluble in dilute caustic alkalies to an orange-yellow solution, from which carbonic acid reprecipitates the original body.

These new compounds constitute the lower homologues of the diarylimino derivatives described by the applicants in their U. S. application No. 670,099, and hence their properties are very near those of these latter compounds.

The following examples illustrate the invention, the parts being by weight:—

*Example 1.*—2.7 parts of para-toluidine are dissolved in 500 parts of water containing 5.8 parts of sodium bicarbonate and while this solution is violently agitated in contact with air there are introduced gradually 7.2 parts of 1:2:4-aminonaphthol sulphonic acid. An insoluble yellow crystalline precipitate is speedily formed. It is drained and washed and may be re-crystallized from alcohol. It then forms yellow needles, grouped in dots, melts with decomposition, dissolves in concentrated sulphuric acid to an orange solution, is insoluble in water but soluble in dilute caustic alkalies.

If in this example the corresponding quantity of aniline, ortho-toluidine, ortho-anisidine, parachloraniline para-phenylenediamine or the like is substituted for the para-toluidine there is obtained an analogous compound. Instead of working in contact with air the operation may be conducted in a closed vessel in an atmosphere of oxygen.

*Example 2.*—52 parts of 1:2:4-aminonaphthol sulphonic acid, 14 parts of anhydrous sodium carbonate and 25 parts of aniline are dissolved in 800 parts of water. The cold solution is agitated and oxidized by gradual addition of sodium hypochlorite until there is an excess of chlorine and the precipitate no longer increases. The latter is drained and may be purified by solution in cold dilute caustic soda and immediate reprecipitation from the filtered solution, by sodium bicarbonate. The 1-imino-2-hydroxy-4-phenyliminonaphthoquinone thus obtained crystallizes from alcohol in brilliant orange plates. The same result is obtained by using another oxidizing agent, such as ammonium persulphate, or iodine dissolved in alkaline bicarbonate solution.

*Example 3.*—30 parts of nitroso-β-naphthol are dissolved in 300 parts of aniline and 30 parts of benzine. The whole is heated to boiling, which is continued for about 12 minutes. After cooling, the mass is left at rest for some time. It consists of beautiful yellow plates which constitute the following compound:

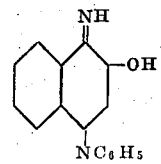

identical with that described in Example 2, and shows the chemical properties and analysis of this body.

*Analysis.*

|   | Found | Calculated for $C_{16}H_{12}ON_2$ |
|---|---|---|
| C | 77,54 | 77,4 |
| H | 4,94 | 4,8 |
| N | 11,36 | 11,3 |

*Example 4.*—A mixture of 3.2 parts of 1.2 amino-naphthol 8 parts of anhydrous sodium carbonate, 3 parts of aniline and 400 parts of water is agitated in contact with air. From the first there is formed a yellowish product which after 12 hours agitation assumes a darker color. It is drained, redissolved in cold dilute soda solution and the solution is filtered and precipitated with bicarbonate of soda. The product crystallizes from alcohol in the form of beautiful yellow crystals of the preceding imino body.

What we claim is:

1. As new products, the derivatives of imino-1-hydroxy-2-naphthoquinone corresponding to the general formula:

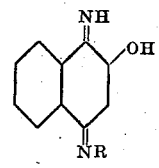

wherein R designates an aromatic radical.

2. The herein described manufacture of new compounds of the derivatives of imino-1-hydroxy-2-naphthoquinone, corresponding to the general formula:

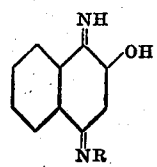

wherein R designates an aromatic radical which consists in the simultaneous oxidizing of aminonaphtholsulphonic acid 1.2.4 in the presence of the primary aromatic amines.

In testimony whereof we have signed this specification.

ROBERT LANTZ.
ANDRÉ WAHL.